United States Patent
D'Angelo et al.

(10) Patent No.: US 11,516,264 B2
(45) Date of Patent: *Nov. 29, 2022

(54) METHODS AND SYSTEMS FOR SOLICITING AN ANSWER TO A QUESTION

(71) Applicant: Quora, Inc., Mountain View, CA (US)

(72) Inventors: Adam Edward D'Angelo, Palo Alto, CA (US); Charles Duplain Cheever, Palo Alto, CA (US); Kevin G. Der, Palo Alto, CA (US); Rebekah Marie Cox, Mountain View, CA (US)

(73) Assignee: QUORA, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,351

(22) Filed: Sep. 28, 2021

(65) Prior Publication Data
US 2022/0086199 A1    Mar. 17, 2022

Related U.S. Application Data

(63) Continuation of application No. 15/877,289, filed on Jan. 22, 2018, now Pat. No. 11,159,588, which is a
(Continued)

(51) Int. Cl.
*G06F 3/048* (2013.01)
*H04L 65/40* (2022.01)
(Continued)

(52) U.S. Cl.
CPC ............. *H04L 65/40* (2013.01); *G06F 3/048* (2013.01); *G06F 16/3329* (2019.01); *G06Q 10/10* (2013.01)

(58) Field of Classification Search
CPC ....... H04L 51/14; H04L 67/306; H04L 65/40; G06Q 10/06; G06Q 10/10; G06F 16/3329
See application file for complete search history.

(56) References Cited

U.S. PATENT DOCUMENTS

| 6,064,978 A | 5/2000 | Gardner et al. |
| 6,433,795 B1 | 8/2002 | MacNaughton et al. |

(Continued)

FOREIGN PATENT DOCUMENTS

| KR | 10-2003-0036500 A | 5/2003 |
| KR | 10-2001-0087880 A | 9/2011 |
| WO | 2004102413 A | 11/2004 |

OTHER PUBLICATIONS

Evite, http://evite.com, May 17, 2006, pp. 1-3.
(Continued)

*Primary Examiner* — Eric J Yoon
(74) *Attorney, Agent, or Firm* — Polsinelli LLP

(57) ABSTRACT

A question-and-answer application with an "ask-to-answer" feature is described. The ask-to-answer feature enables any user to solicit an answer to a question from another user. Upon soliciting another user for an answer to a particular question, a message with a call to action is directed to the solicited user. The message may include a copy of the text of the question and may provide a mechanism (e.g., a selectable user interface element) enabling the solicited user to pass on answering the question. Subsequent to the solicitation, the question page for the question will include a notification with information about the solicitation, including in some instances information identifying the user who has been asked to answer the question and the number of times the user has been asked to provide an answer to the question.

20 Claims, 13 Drawing Sheets

Related U.S. Application Data continuation of application No. 13/968,788, filed on Aug. 16, 2013, now abandoned, which is a continuation of application No. 12/983,056, filed on Dec. 31, 2010, now Pat. No. 8,516,379.

(51) Int. Cl.
  *G06F 16/332* (2019.01)
  *G06Q 10/10* (2012.01)

(56) References Cited

U.S. PATENT DOCUMENTS

| | | | |
|---|---|---|---|
| 7,523,167 | B2 | 4/2009 | Thomas et al. |
| 7,957,510 | B2 | 6/2011 | Denney et al. |
| 8,516,379 | B2 | 8/2013 | D'Angelo et al. |
| 8,751,559 | B2 | 6/2014 | Richardson |
| 9,124,447 | B2 | 9/2015 | Goodman et al. |
| 9,183,251 | B1 | 11/2015 | Zhang et al. |
| 2001/0032244 | A1 | 10/2001 | Neustel |
| 2003/0140037 | A1 | 7/2003 | Deh-Lee |
| 2005/0125544 | A1 | 6/2005 | Zhao |
| 2006/0240851 | A1 | 10/2006 | Washburn |
| 2007/0219794 | A1* | 9/2007 | Park .................. G06Q 30/0613 704/246 |
| 2007/0219958 | A1 | 9/2007 | Park et al. |
| 2009/0012833 | A1 | 1/2009 | Kuhlke |
| 2009/0049042 | A1 | 2/2009 | An |
| 2009/0125598 | A1 | 5/2009 | Sun |
| 2010/0070554 | A1 | 3/2010 | Richardson et al. |
| 2011/0041082 | A1 | 2/2011 | Nguyen |
| 2011/0055207 | A1 | 3/2011 | Schorzman |
| 2011/0055309 | A1 | 3/2011 | Gibor et al. |
| 2011/0196922 | A1 | 8/2011 | Marcucci et al. |
| 2011/0246910 | A1 | 10/2011 | Moxley et al. |
| 2011/0302098 | A1 | 12/2011 | Yoshida et al. |
| 2012/0173992 | A1 | 7/2012 | D'Angelo et al. |
| 2013/0339879 | A1 | 12/2013 | D'Angelo et al. |
| 2014/0032273 | A1 | 1/2014 | D'Angelo et al. |
| 2015/0019525 | A1 | 1/2015 | Barak et al. |
| 2016/0259789 | A1 | 9/2016 | Shrinath et al. |
| 2020/0089708 | A1 | 3/2020 | Pattan et al. |

OTHER PUBLICATIONS

Microsoft Office Communicator 2007, Dec. 31, 2008, R2, pp. 1-3.
Twitter, http://twitter.com, Dec. 17, 2008, p. 11.
Yahoo Answers, http://answers.yahoo.com, Mar. 20, 2009, pp. 4-5.
Office Action dated Mar. 26, 2021 in U.S. Appl. No. 16/404,453.
Office Action dated Nov. 13, 2020 in U.S. Appl. No. 16/404,453.
International Search Report and Written Opinion dated Jul. 19, 2004 in International Application PCT/KR2004/001106.
"Web page from Mochahost," Retrieved from internet: https://www.mochahost.com/cancel_request.php, Feb. 8, 2010.
Office Action dated Oct. 26, 2012 in U.S. Appl. No. 12/983,056.
Notice of Allowance dated Apr. 15, 2013 in U.S. Appl. No. 12/983,056.
Office Action dated Oct. 27, 2016 in U.S. Appl. No. 13/968,788.
Office Action dated Jul. 27, 2017 in U.S. Appl. No. 13/968,788.
Office Action dated Mar. 21, 2016 in U.S. Appl. No. 13/968,788.
Baichuan Li et al., "Routing Questions to Appropriate Answerers in Community Question Answering Services," CIKM '10 Proceedings of the 19th ACM Interntional Conference on Information and Knowledge Management, Oct. 2010, pp. 1585-1588.
M. Miller, "Absolute Beginner's Guide to Understanding and Using Feedback on eBay," published Jun. 30, 2006, downloaded at https://www.informit.com/articles/.aspx?p=482335 (Year 2006).
Notice of Allowance dated Sep. 29, 2021 in U.S. Appl. No. 16/404,453.

\* cited by examiner

FIGURE 7

ADD QUESTION or SEARCH (AMUSEMENT PARKS ×) (DISNEYLAND ×) ADD TOPIC

WHAT ARE THE MOST POPULAR RIDES AT DISNEYLAND?

ADD QUESTION DETAILS

ADD COMMENT   ADD FOLLOW-UP QUESTION   FLAG QUESTION

2 ANSWERS

△▽ JOHN SMITH, FOLLOWED BY 112 PEOPLE
1 vote by Greg Johnson

Just got back from Disneyland. The longest lines were, and almost always are, for Space Mountain, then Matterhorn, Splash Mountain, Indiana Jones, and Big Thunder Railroad. However, line length probably isn't the only thing to evaluate when assessing popularity.

ADD COMMENT   THANK   NOT HELPFUL

△▽ KATE JOHANSEN
1 vote by Steve Klein

Pirates of the Caribbean, Disneyland has some surprise mini-rollercoaster-like dips that POTC, DW doesn't have. Star Tours is also fun, if that's still around

ADD COMMENT   THANK   NOT HELPFUL

Add Answer as USER 1 (make anonymous)

[B] [I] [U] [" ] [≡] [⋮⋮⋮]

SUBMIT ANSWER (FOLLOW QUESTION)

RELATED QUESTIONS

What are the best amusement parks in California?

What is the highest roller coaster in Disneyland?

See more related questions

SHARE QUESTION or ASK TO ANSWER   130

[FIND PEOPLE]

Question Stats
Latest Activity: 4:25 PM
This question has been viewed 12 times and has 155 topic followers.

3 people are following this question

FIGURE 8

ADD QUESTION or SEARCH

AMUSEMENT PARKS ×   DISNEYLAND ×   ADD TOPIC

WHAT ARE THE MOST POPULAR RIDES AT DISNEYLAND?

ADD QUESTION DETAILS

ADD COMMENT   ADD FOLLOW-UP QUESTION   FLAG QUESTION

2 ANSWERS

△▽ JOHN SMITH, FOLLOWED BY 112 PEOPLE
1 vote by Greg Johnson

Just got back from Disneyland. The longest lines were, and almost always are, for Space Mountain, then Matterhorn, Splash Mountain, Indiana Jones, and Big Thunder Railroad. However, line length probably isn't the only thing to evaluate when assessing popularity.

ADD COMMENT   THANK   NOT HELPFUL

△▽ KATE JOHANSEN
1 vote by Steve Klein

Pirates of the Caribbean, Disneyland has some surprise mini-rollercoaster-like dips that POTC, DW doesn't have. Star Tours is also fun, if that's still around

ADD COMMENT   THANK   NOT HELPFUL

Add Answer as USER 1 (make anonymous)

[ B  I  U  ≡  ≡≡ ]

SUBMIT ANSWER

FOLLOW QUESTION

RELATED QUESTIONS

What are the best amusement parks in California?

What is the highest roller coaster in Disneyland?

See more related questions

SHARE QUESTION or ASK TO ANSWER

JOHN

JOHN KILPATRICK
JOHN SMITH
FRED JOHNSON
DAVID JOHNSON
JOHN TRAN
JOHN XANADU

METHODS AND SYSTEMS FOR SOLICITING AN ANSWER TO A QUESTION

CROSS-REFERENCE TO RELATED APPLICATIONS

The present application is a continuation of U.S. patent application Ser. No. 15/877,289 filed Jan. 22, 2018, which is a continuation of U.S. patent application Ser. No. 13/968,788 filed Aug. 16, 2013, which claims the benefit of U.S. Provisional patent application Ser. No. 12/983,056, filed on Dec. 31, 2010, now U.S. Pat. No. 8,516,379 issued Aug. 20, 2013, which are hereby incorporated herein by reference in their entireties.

TECHNICAL FIELD

The present disclosure generally relates to data processing techniques. More specifically, the present disclosure relates to methods and systems for enhancing the quality of user-generated content for presentation via a question-and-answer service by enabling users of the service to directly solicit an answer to a question from another user.

BACKGROUND

Many on-line or web-based applications and services rely partially, and in some cases almost entirely, on user-generated content—that is, content generated by the end-users of the particular application or service. The success of such applications and services is heavily dependent upon the ability to attract and retain users who are willing to participate by generating content that is to be shared with other users. One particular type of application or service for which this holds true is an on-line question-and-answer service. In general, a question-and-answer service is a service that allows its end-users to post questions, post answers to questions, or simply browse the questions and answers that others have posted. From the perspective of its users, the usefulness of a question-and-answer service or application depends significantly on the extent to which meaningful answers are provided to the questions being posted.

DESCRIPTION OF THE DRAWINGS

Some embodiments of the invention are illustrated by way of example, and not limitation, in the figures of the accompanying drawings, in which:

FIGS. 7 through 12 illustrate various user interfaces, and portions of user interfaces, for use in methods and systems for facilitating the solicitation of an answer to a question from a user of a question-and-answer service, consistent with embodiments of the invention.

DETAILED DESCRIPTION

Figure 1:
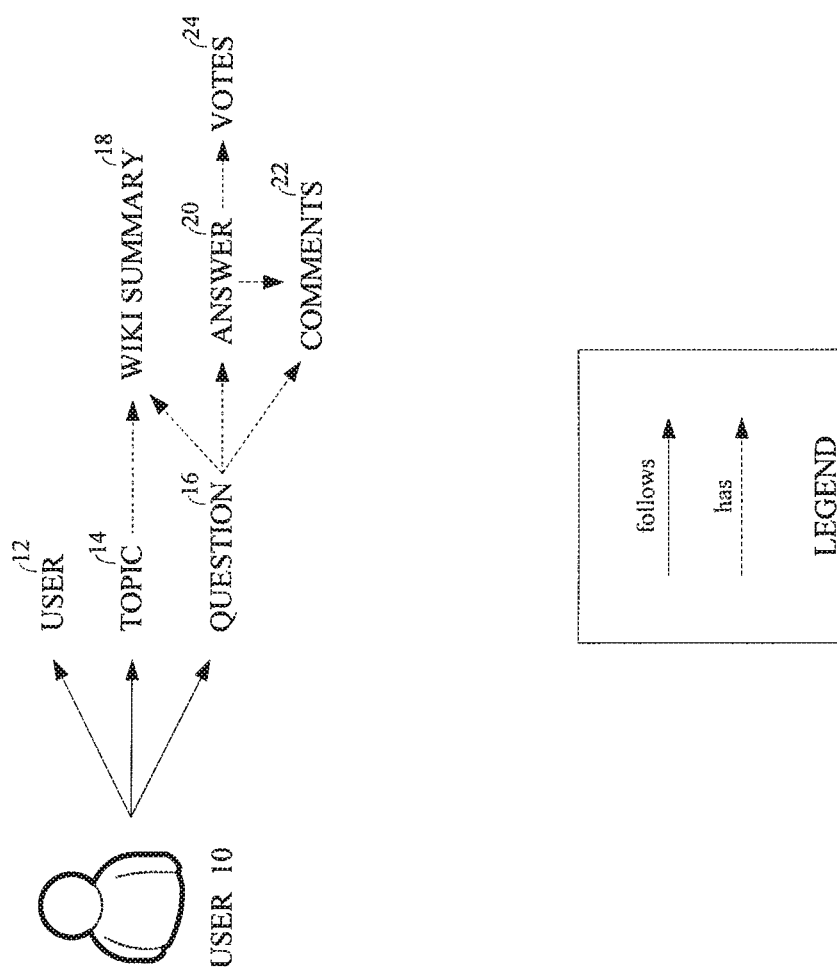
FIG. 1 is a simple relationship diagram illustrating how some of the various elements and participants of a question-and-answer application are related to one another in a particular embodiment of the invention.

Methods and systems for enabling a user of a question-and-answer service to directly solicit an answer to a question from another user are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

A question-and-answer application or service provides an on-line forum where users can post questions, post answers to questions, or simply search for and review questions and answers that others have posted. To aid in the overall organization and presentation of information, a question can be associated with one or more topics representing, for example, a subject matter to which the question relates. Take for example the question, "What is the population of San Francisco?" This question may be assigned to the topic, "San Francisco." As users post questions for others to answer, users can designate each question as being related to one or more existing topics, or users can create and designate new topics. As such, a question-and-answer application is an information repository of user-generated content that is organized and presented in a relatively simple and intuitive manner. An individual web page showing all questions related to a particular topic may be referred to as a topic page, whereas a web page showing an individual question, and any associated answers to the question, is generally referred to herein as a question page.

To encourage users to share and exchange information, and to increase overall participation in a question-and-answer application, a question-and-answer application may enable users to share information with one another. For example, the user interface of a question-and-answer application may include a user interface element (e.g., a button or link) that, when selected, prompts the viewing user to provide contact information (e.g., a name, an email address, a telephone number) of a user with whom the information is to be shared. Any number of communication mechanisms might be used to share information in this manner, to include, but certainly not be limited to: email, instant messaging, SMS or text messaging, some proprietary messaging system, as well as any other similar messaging systems. In some instances, the message communicated to the user will contain a copy of the actual content. In other instances, the message may simply include a selectable link (e.g., a Uniform Resource Identifier (URI) or Uniform Resource Locator (URL)) to the relevant content. In this manner, a first user may share with a second user an unanswered question, a question for which there are one or more existing answers, a particular answer to a question, or some other related item of information.

In one particular scenario, a first user may share a question with a second user whom the first user believes to be particularly well-suited to provide an answer. Stated differently, a user may share a question with another user with the expectation that the receiving user provide an answer to the question. However, while sharing information in this manner is certainly useful, it may or may not actually encourage or persuade a user to take a particular action, such as to provide an answer to a question. For instance, if a user receives a private and direct message from another user, such that the message includes a question, or a link to a question, the recipient may choose to simply ignore the message and not provide an answer to the question.

Various aspects of the inventive methods and systems described herein aim to increase the likelihood that a user, when requested to answer a particular question, will be encouraged to actually provide an answer. For example, consistent with some embodiments of the invention, when a user solicits an answer to a question from another user, the message communicated to the other user includes a specific call to action, requesting that the recipient of the message provide an answer to the question. In some instances, the message may be formatted to include a copy of the actual text of the question, a link to the question page for the question, as well as a user interface element, such as a text input box, in which the recipient can enter or input his or her answer to the question. In addition, consistent with some embodiments, when a first user solicits an answer to a question from a second user, the solicitation is made public. For example, subsequent to the solicitation, the question page for the question will include a notification displayed next to or near the question indicating that a particular user has been solicited for an answer to the question. The notification may also include, for example, a name and picture of the user who has been solicited to answer the question. Selecting the name and/or picture of the user who has been asked to answer the question may cause some portion of the user's profile or biographical information to be displayed. If several users have solicited a particular user for an answer to the same question, the notification may indicate the number of times that the particular user has been solicited to answer the question. In some embodiments, the notification may also identify the individual user or users who have solicited the recipient for an answer. This information may be displayed in connection with the notification, or as a result of detecting a certain event, such as a mouse-over event. Other aspects of the inventive subject matter are set forth below in connection with the description of the various figures.

FIG. 1 is a simple relationship diagram illustrating how some of the various elements and participants of a question-and-answer application are related to one another in a particular embodiment of the invention. For instance, as illustrated in FIG. 1, a user 10 of the question-and-answer application may follow another user 12, a topic 14, or a question 16. As used herein, the concept of "following" is somewhat analogous to the concept of subscribing in a subscription-based model. When a user follows another user, there is no implied personal relationship between the two end-users. For instance, a first user may follow a second user simply because the first user believes the second user is particularly insightful with respect to a particular topic of interest. By "following" another user, a user can be automatically informed of activities of the other user. If, for example, user A is following user B, when user B posts a question or an answer to a question, user A will be notified of user B's posting activity. Similarly, if a user elects to follow a particular topic, as new questions are assigned to the particular topic, the user can be automatically notified of these new questions. In yet another example, if a user follows a particular question, as new answers are posted to the particular question, the user will be notified of the new answers.

The concept of "following" may be thought of as a unilateral relationship, because it can be achieved at the desire of only one user. This is in contrast to the concept of two users being "connected" (e.g., in a social networking context), which typically implies a personal relationship between the users. Two users may be "connected" when each user is following the other—a bilaterally defined relationship. In some embodiments of the invention, the interactions that the users are allowed to have with one another may be controlled to some extent by the type of relationship that exists between the users, as that relationship is defined by the question-and-answer service, or some externally-hosted social network service. For instance, with some embodiments, a first user may only solicit an answer to a question from another user if the first user is following the other user, or if the first user is being followed by the second user. Similarly, with some embodiments, the first user may only be allowed to solicit an answer to a question from another user if the users are connected—that is, each user is following the other. In yet other embodiments, users may be able to solicit an answer from one another regardless of any pre-existing system-defined relationship between the users.

In some embodiments of the invention, notifications may be communicated to a user by simply including the relevant content in a landing page or data feed displayed to the user. For example, when a user first provides his or her authentication information (e.g., username/password), the user may be presented with a personalized home page or landing page with content that is customized for the user. This content may be selected to include information regarding the users, topics and questions that the particular user is following. Additionally, in some embodiments, notifications may be communicated in near real-time to a user via any number of messaging mechanisms, to include real-time dynamic data feed updates (e.g., on a web page), email, SMS or text messages, instant messages, and others. In some embodiments, a user may elect to be notified of certain activities or events on a per-question, per-topic or per-user basis. For instance, a user may elect to receive a notification when a new answer is posted to a particular question that the user is following.

Referring again to FIG. 1, a topic 14 may have a wiki summary 18 that provides a summary or some additional description of what subject matter is encompassed by the particular topic. Similarly, a question 16 may have a wiki summary 18 that provides some description or additional context for the question. In some embodiments, the wiki summary 18 for topics and questions may be user-editable by all users, while in other embodiments, only certain users will have the authority to edit a wild summary. For instance, in some embodiments, only the person who posted a particular question may be authorized to edit the wiki summary for that particular question. In some embodiments, users may be assigned roles that determine various content or access privileges the users have with respect to different topics or questions. For instance, certain users may be assigned an "editor" role for a particular topic, thereby providing those users with editing privileges that are different from those of a regular user.

In addition to a wiki summary 18, a question 16 is associated with one or more answers 20. For instance, after a user posts a question, other users of the application are able to provide answers to the question. In some embodiments of the invention, any user is allowed to post an answer to a particular question. As such, a question may be associated with or have multiple answers. In some embodiments, both questions 16 and answers 20 may have comments. For instance, a user may provide a textual comment that is associated with a question 16 or an answer 20. A comment associated with an answer, for example, could provide some clarification about a particular answer, or some aspect of the answer. Other users can then view the comments when viewing the question and/or answers.

In some embodiments of the invention, an answer 20 has or is associated with votes 24. For example, users can vote up or vote down a particular answer based on whether the user finds the answer helpful in view of the particular question. For instance, if a user believes that a particular answer to a question is a good answer, the user can select a button or other graphical user interface element to vote for the answer. Similarly, if a user believes that a particular answer is not helpful in light of the question, the user can vote down the answer, for example, by simply selecting a button or other graphical user interface element to indicate that the answer is not helpful. As described in greater detail below, with some embodiments, when a first user solicits an answer to a question from a second user, and the second user provides an answer, the first user's solicitation may be automatically converted to a vote for the answer provided by the second user. In some embodiments, the number of votes for and against an answer are used as inputs to an algorithm that determines how answers are to be displayed when presented to a user. For example, the votes for and against an answer may simply be tallied, such that a vote for the answer offsets a vote against the answer, and the answers with the highest vote tallies are displayed in the most prominent positions—typically, at the top of a list of relevant answers. With some embodiments, a vote by a particular user may be deemed as more important, for example, as based on the particular user's profile information, and as such, the particular user's vote may be given more weight than a vote by other users.

By providing a forum that includes questions, answers, comments and votes, the question-and-answer application encourages meaningful discussion about a whole host of subject matters, in part, by enabling users to interact with the application in a variety of ways. For instance, some users may desire an entirely passive experience, and can therefore simply browse for, and read, questions and answers on topics of interest. Some users may desire an experience including a moderate level of participation, and as such, these users can vote up or down various answers on topics of interest, and possibly provide commentary. Others may desire to participate more actively, and will elect to post questions and answers to questions—particularly when specifically called upon to do so by another user.

Figure 2:
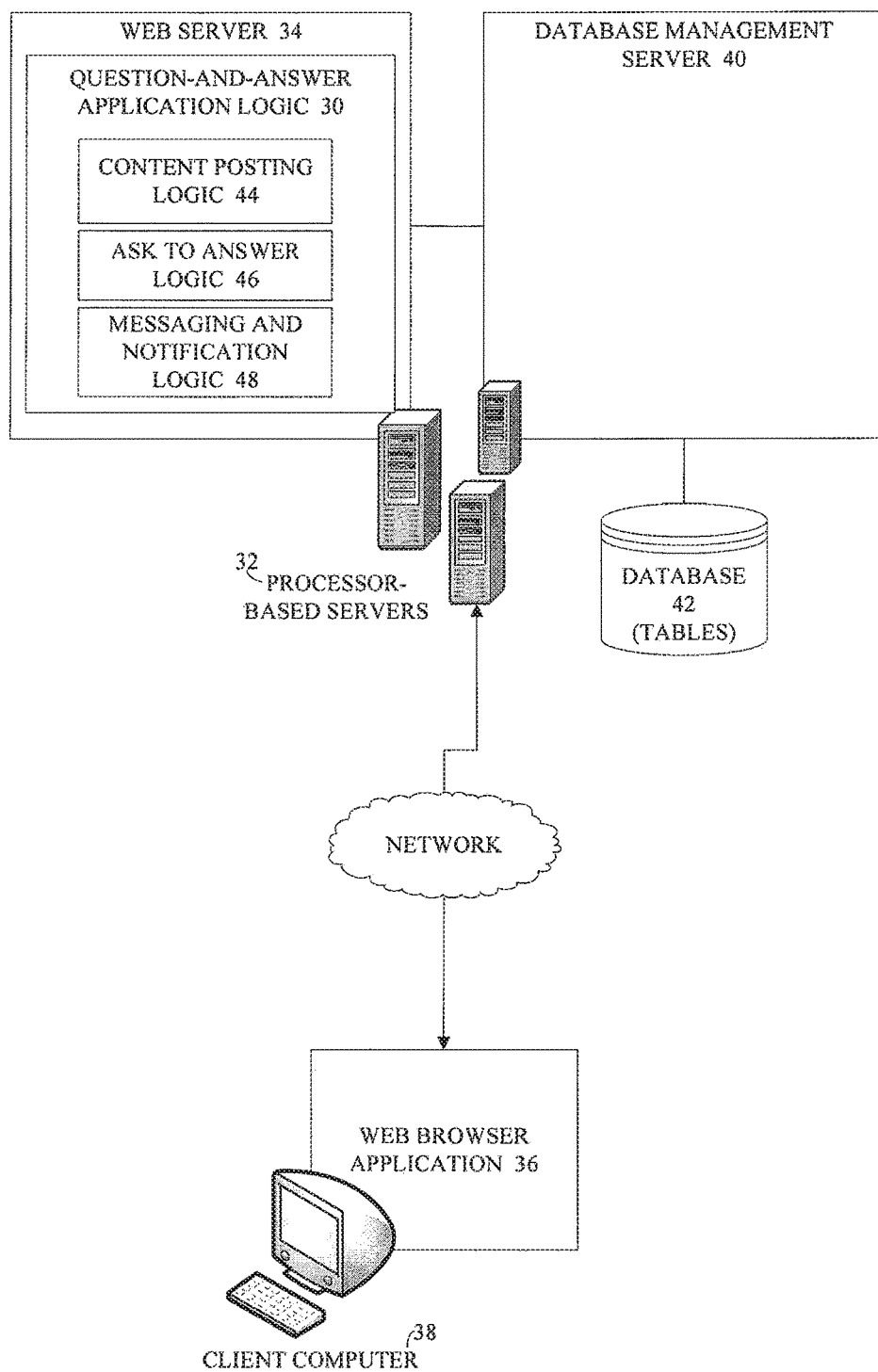
FIG. 2 is a system-level block diagram illustrating some of the system components and functional modules used in implementing a question-and-answer application consistent with an embodiment of the invention.

FIG. 2 is a system-level block diagram illustrating some of the system components and functional modules used in implementing a question-and-answer application or service consistent with an embodiment of the invention. As illustrated in FIG. 2, in some embodiments, a question-and-answer application is implemented as a web-based application having application logic 30 residing at one or more processor-based computer servers 32. At least some of the servers 32 include a web server component 34 for serving data (e.g., documents or web pages) to a conventional web browser application 36 residing and executing at a client computer 38. In addition, or as an alternative, the web server 34 may utilize one or more web-based protocols to serve content to non-web browser clients, such as a web-based mobile application residing and executing on a mobile device, a set top box, or some other computing device.

As illustrated in FIG. 2, a client computer 38 executes a web browser application 36 to access the web-based question-and-answer application. In various alternative embodiments, the client computer 38 may be a mobile computing device, to include: a laptop, mobile phone or tablet computer. As such, in some embodiments, the application may have a user interface that is customized for display in a browser, or mobile application, of a mobile device. Furthermore, with some embodiments, the client-based application may not be browser-based, but instead may be customized to suit the particular operating system of the device on which it is executing. For instance, a customized application may utilize one or more application programming interfaces that are unique to the particular device and operating system on which the customized application resides and executes.

The question-and-answer application logic 30 is shown in FIG. 2 to include content posting logic 44, ask-to-answer logic 46, and messaging and notification logic 48. In general, the content posting logic 44 enables users to post questions, answers and comments, and other content items. The ask-to-answer logic 46 facilitates a feature referred to herein as an ask-to-answer feature. Accordingly, the ask-to-answer logic 46 enables various functionality associated with enabling a first user to solicit another user for an answer to a question that has already been posted. The messaging and notification logic 48 operates in conjunction with the content posting logic 44 and the ask-to-answer logic 46 to facilitate the generation and communication of messages and notifications, for example, such as those that may pertain to the solicitation of an answer to a question. Of course, the application logic 30 may include a number of other logical components to perform a variety of other tasks and functions beyond the immediate scope of the present inventive subject matter. As such, to avoid obscuring the inventive subject matter in unnecessary detail, these various functional components have not been included in FIG. 2.

In some embodiments, some of the various functional components of the question-and-answer application, including some of the various software modules, may be distributed across several server computers, providing application reliability and scalability. For instance, as illustrated in FIG. 2, the database management server 40 is shown to reside on a separate server computer. However, in other embodiments the database management server 40 might reside and execute at the same server as the application logic 30 and web server 34. In any case, the database management server 40 facilitates the writing and reading of data stored in tables of a database 42. In some alternative embodiments, other data structures may be utilized in addition to, or in place of, database tables.

Consistent with some embodiments, the question-and-answer service is a stand-alone service accessible via its own unique address (e.g., URL or URI). With some embodiments, the stand-alone service may leverage its own social layer, or a social layer provided by an externally-hosted social network service. Accordingly, various relationships between users, as determined or defined by the question-and-answer service or an externally-hosted social network service, may be utilized to customize the functionality and features of the question-and-answer service. For example, certain interactions between users may be controlled based on the relationships that exist between the users, as those relationships are defined by an externally-hosted social network service. Alternatively, with some embodiments, the question-and-answer service may be one of several applications or services that are associated with, and provided by, a social network service. For instance, the question-and-answer service may be accessible via the same address or domain by which users access a social network service, such that the question-and-answer service is hosted by the same entity providing the social network service.

Figure 3:
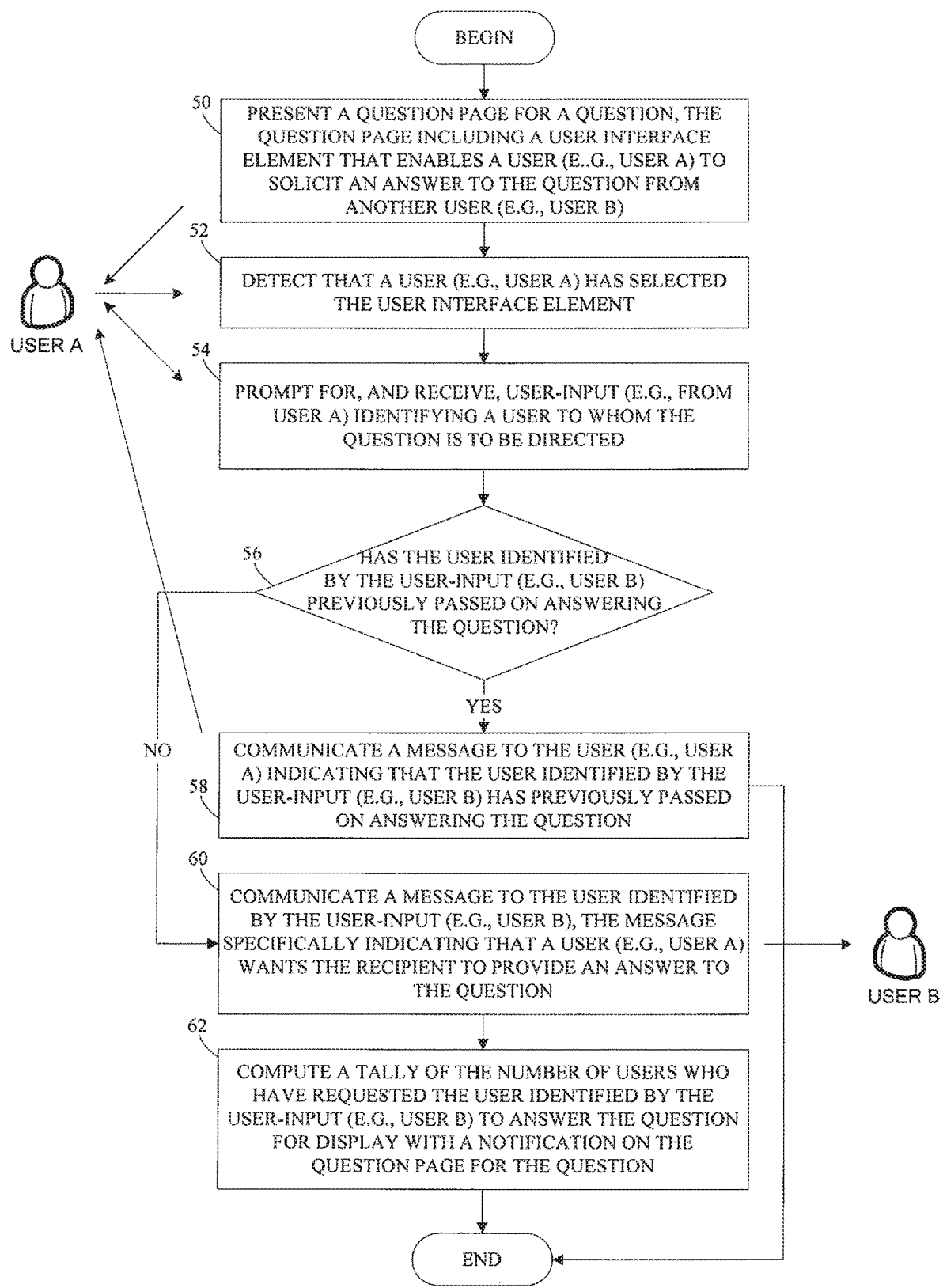
FIGS. 3 and 4 are flow diagrams representing methods, consistent with an embodiment of the invention, for facilitating and enabling a user of a question-and-answer application to solicit another user for an answer to a question.
Figure 7:
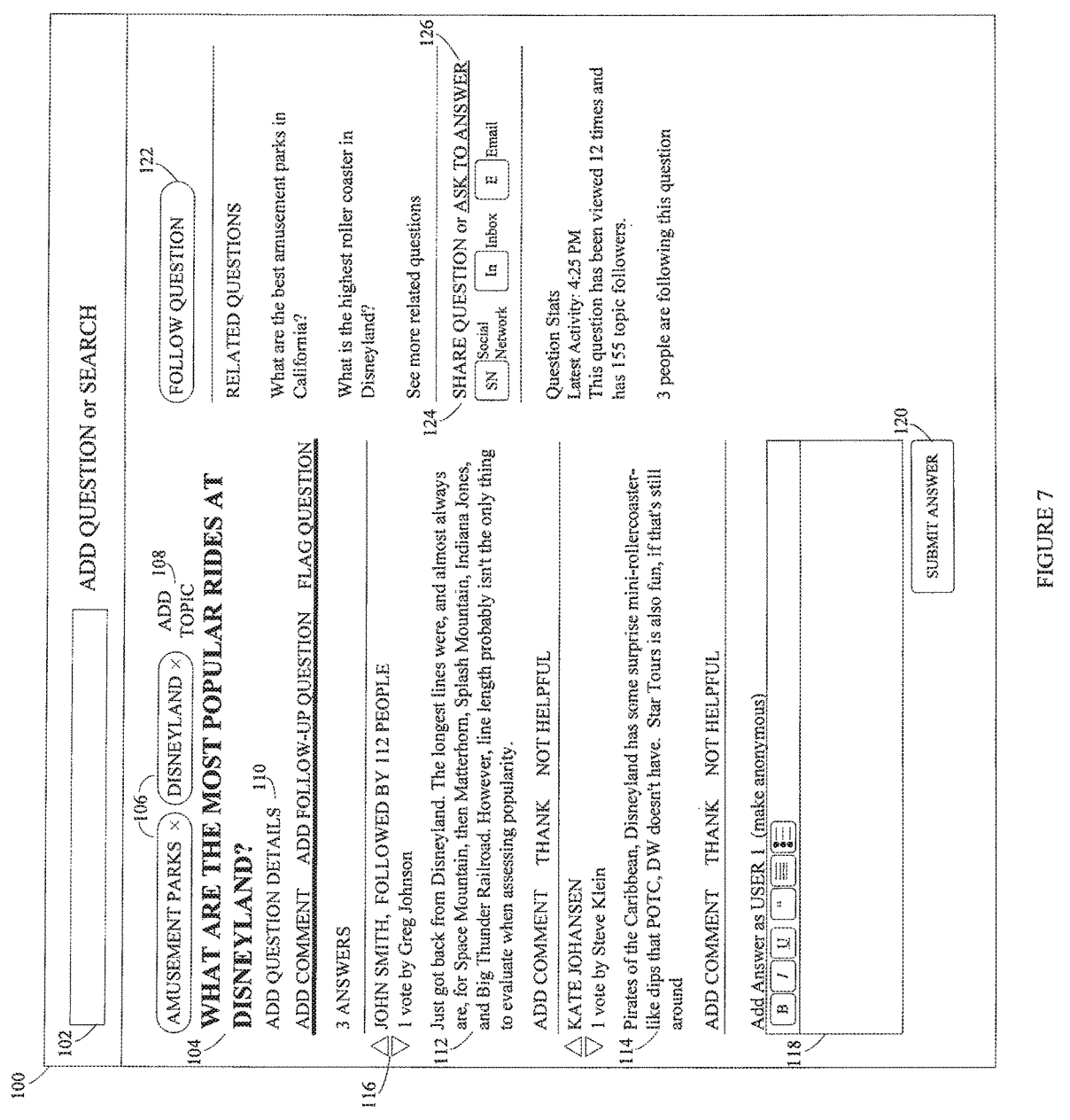

FIG. 3 is a flow diagram representing a method for facilitating and enabling a user of a question-and-answer application to solicit an answer to a question from another user, consistent with some embodiments of the invention. As illustrated in FIG. 3, the method begins at method operation 50 when a question-and-answer service presents to a user a question page for a question. For purposes of this example, the user to whom the question page is presented is shown in FIG. 3 as "USER A". The question page displays a question that a user has posted, and in addition, the question page displays a user interface element, such as a link, a button, a text input box, a selector, or some other graphical element, with which a user can interact (e.g., by selecting, or entering input). In general, this user interface element enables the user (e.g., USER A) to solicit an answer to the question from another user. An example of a question page consistent with an embodiment of the invention is illustrated in FIG. 7, which shows a user interface element in the form of a textual link, with the label "ASK TO ANSWER" 126.

Referring again to FIG. 3, at method operation 52, the question-and-answer service detects an event or interaction with the user interface element (e.g., element 126 in FIG. 7), by a user (e.g., USER A). For example, in some embodiments, when a user selects the button or link on the question page that enables the user to solicit an answer to a question from another user, the selection is detected by the question-and-answer service when a request is communicated from the client application (e.g., a web browser application) to the server on which the question-and-answer service resides, enabling the server to respond by manipulating the user interface displayed at the client application. When the selection of the user interface element is detected, at method operation 54 the question-and-answer service prompts the user to provide some user-input identifying another user to whom the question is to be directed. For example, in some embodiments, a text box or some other user interface mechanism for receiving input is displayed. This is illustrated in, and described in connection with, FIGS. 8 and 9, which show an example of a user interface that enables the receiving of user-input (e.g., user interface elements 130 and 132), consistent with an embodiment of the invention.

After receiving the user-input or user-selection identifying the user to whom the question is to be directed (e.g., USER B in FIG. 3), at method operation 56 a determination is made as to whether the user to whom the question is to be directed has previously passed on providing an answer to the question. For instance, if the user to whom the question is being directed has previously been asked to answer the question, and has previously indicated a desire to pass on answering the question, then at method operation 58, the user who is soliciting the answer (e.g., USER A) receives a message indicating that the user to whom the question has been directed has indicated a desire to pass on answering the question.

However, if the user to whom the question is being directed has not previously indicated a desire to pass on answering the question, at method operation 60 the user to whom the question is being directed (e.g., USER B) is sent a message that specifically indicates that the requesting user (e.g., USER A) would like the user (e.g., USER B) to provide an answer to the particular question. The content of the message and the means by which it is communicated may vary depending upon the particular implementation. For instance, with some embodiments, the message may be communicated via a proprietary notification mechanism, such that a notification message is shown on a web page displayed to the user (e.g., USER B). Two examples of such messages are shown, and further described in connection with, FIGS. 11-A and 11-B. In some embodiments, a user may be allowed to specify that the request message soliciting the answer is to be communicated anonymously, such that the identity of the person who is requesting the answer to the question remains private.

With some embodiments, a user can direct a question to any user of the question-and-answer service, and as such, a list of users will be automatically populated with names selected from the entire community of users, so long as those names match the user-input. In some alternative embodiments, a user may be limited in directing a question only to some subset of the entire user community, such as those users with whom the user has established a unilateral relationship (e.g., by "following" another user), or a bilateral relationship (e.g., where each user follows the other). In such a scenario, the list of names dynamically updated for selection would include only those names satisfying the system-defined criteria. In some embodiments, a user can enter contact information for a person who is not currently a user of the question-and-answer service. For example, by entering an e-mail address, telephone number, or some other contact information, an appropriate message may be communicated to the person with a request to provide an answer to a question. The recipient of a solicitation message may be prompted to provide his or her name to be displayed with his or her answer, or alternatively, the recipient may be prompted to register as a user of the question-and-answer service as part of the process of providing the answer.

Figure 10:
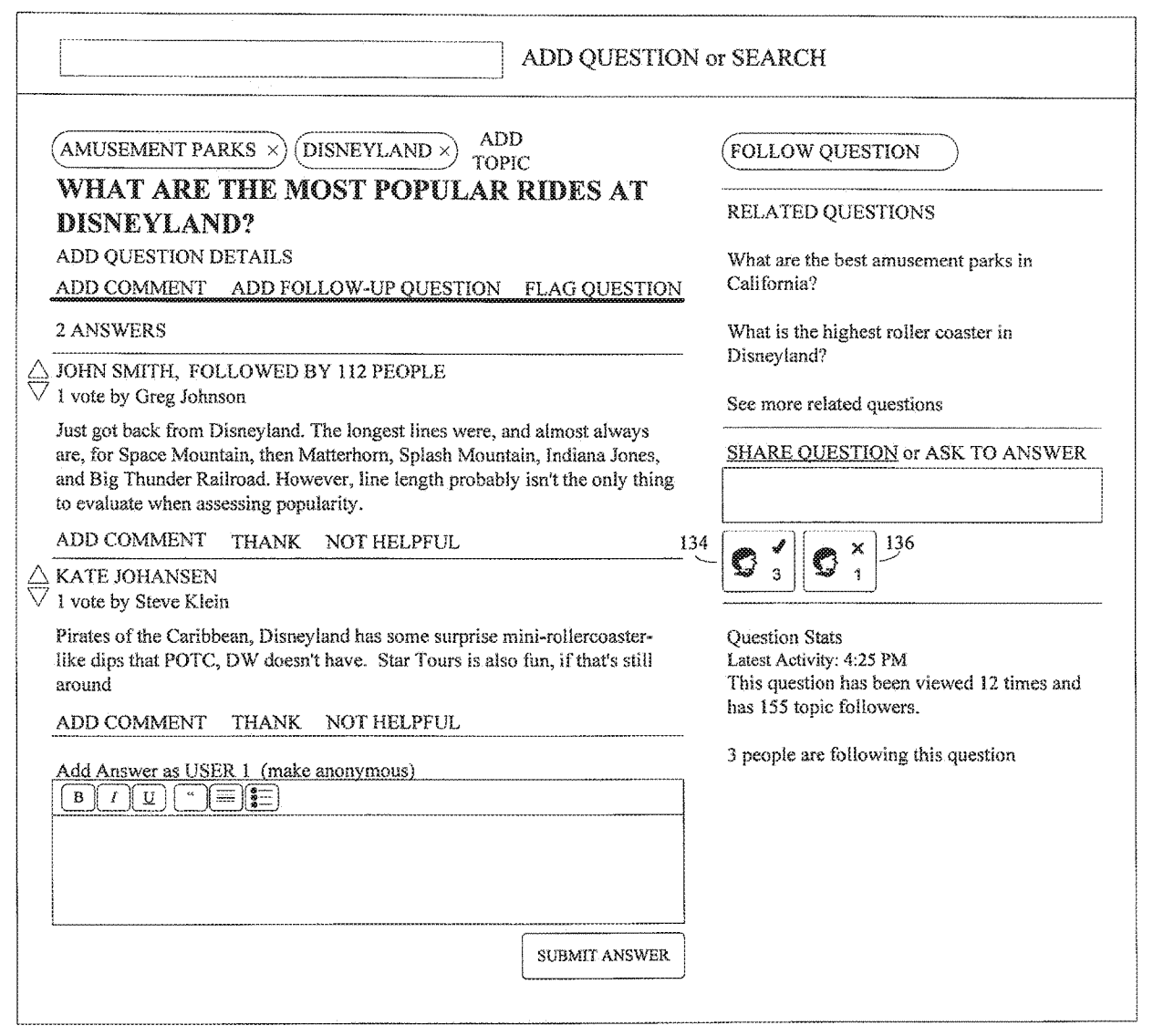

At method operation 62, subsequent to communicating a request to answer a question to a user (e.g., USER B), the total number of requests to answer the question that have been received by the user is computed. For instance, the sum of all ask-to-answer requests that have been directed to a particular user for a particular question is computed so that it can be displayed in a notification on the question page for the question. An example of such a notification is shown in FIG. 10, with reference number 134.

Figure 4:
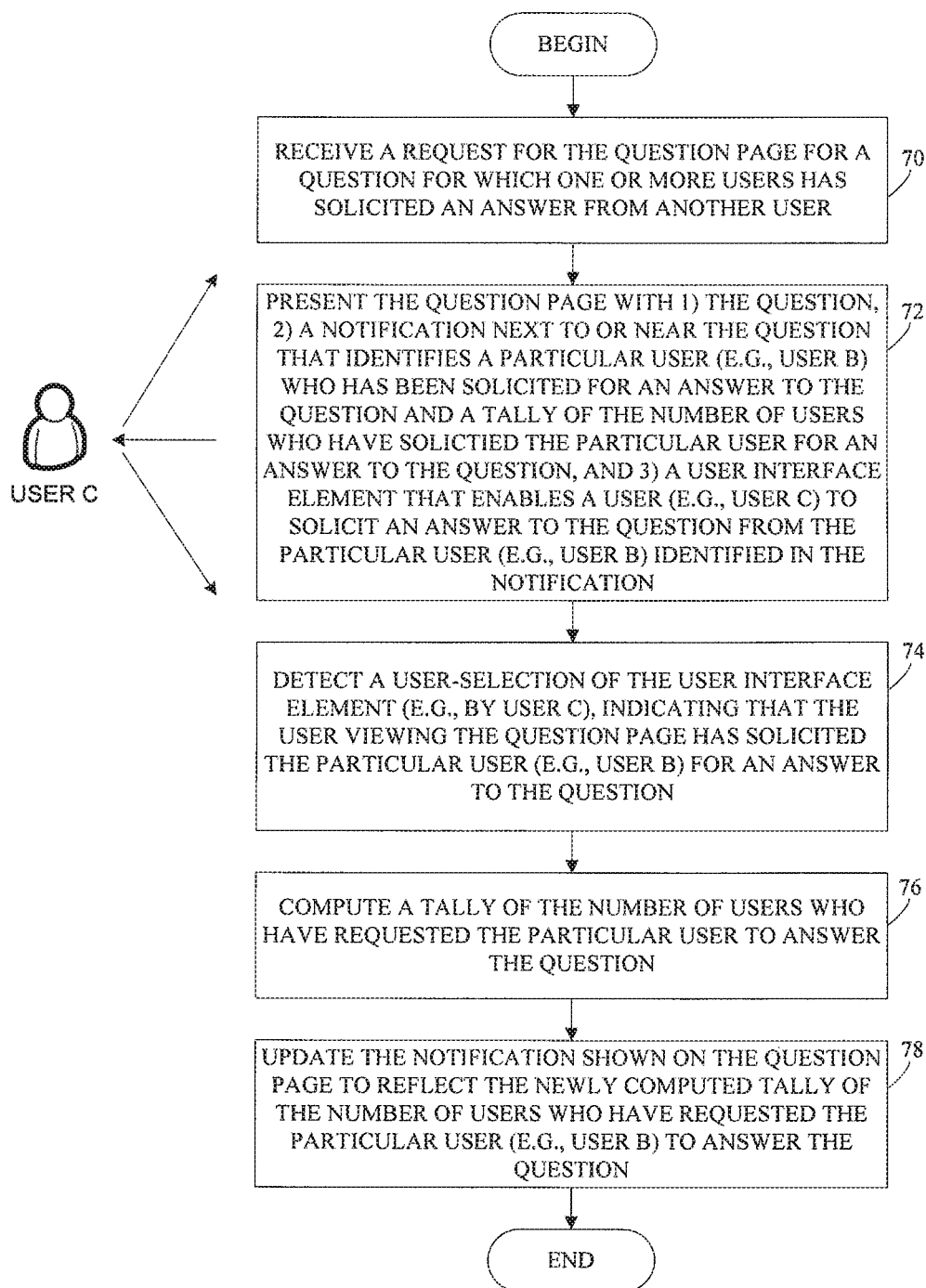

FIG. 4 is a flow diagram representing a method, consistent with some embodiments of the invention, for facilitating and enabling a user of a question-and-answer application to solicit an answer to a question from another user, when the other user has already been solicited for an answer to the question. In some instances, a particular user may have been asked by one or more other users to answer a particular question. Accordingly, the question page for the question will include one or more notifications that identify any users who have been solicited for an answer to the question, as well as the number of times each user has been solicited for an answer. Consistent with some embodiments, a user may interact with this notification (e.g., by selecting the notification, or some portion of the notification) to very quickly solicit an answer from a user who has already been solicited for an answer. An example of such a notification is illustrated in FIG. 10, with reference number 134.

The method begins at method operation 70 when a user (in this example, USER C) requests a question page for a question for which at least one user has already been solicited for an answer from another user (e.g., USER B). For instance, continuing with the example shown in FIG. 3, when method operation 70 occurs, one can presume that USER A has already solicited USER B for an answer to the question on the question page requested by USER C. At method operation 72, the requested question page is presented to the requesting user (e.g., USER C). Because USER A has already solicited USER B for an answer to the question displayed on the question page, a notification will be included on the question page showing, for example, a picture and name of the user who has been solicited for an answer, as well as a number indicating the number of times that the particular user has been solicited for an answer. In addition, a user interface element may be displayed in connection with the notification, such that selection of the user interface element by USER C will automatically generate an additional request or solicitation, on behalf of USER C, directed to USER B and requesting that USER B provide an answer to the question. In the example notification 134 illustrated in FIG. 10, this additional user interface element is a check mark. Accordingly, at method operation 74, the question-and-answer service detects that a user (e.g., USER C) has selected the user interface element displayed in connection with the notification. In response, at method operation 76, the question-and-answer service computes or otherwise determines a tally of the number of users who have requested that the particular user associated with the displayed notification has been solicited for an answer to the question. Finally, at method operation 78, the notification displayed on the question page is updated to reflect the total number of times that the particular user associated with the notification has been solicited for an answer to the question.

Consistent with some embodiments, each individual solicitation for an answer to a question is converted to a vote for the answer that is provided by the person who has been solicited for the answer. For instance, consider again the example presented in FIGS. 3 and 4, in which each of USER A and USER C has solicited USER B for an answer to a question. When USER B provides an answer to the question, USER A's solicitation is automatically converted to a vote for the answer. Similarly, USER C's solicitation is also converted to a vote for the answer. In some embodiments, the number of votes that an answer receives may affect the order in which the answer is displayed relative to other answers. For instance, the answer with the most votes may be displayed in the most prominent position (e.g., at or near the top) of the list of answers. In addition, with some embodiments, when an answer is presented on a question page, the names of the users who solicited the provider of the answer to provide the answer may be presented in connection with the answer. Accordingly, if a particular answer gains notoriety for some reason, each person who solicited the answer may be recognized by the user community as well.

Figure 5:
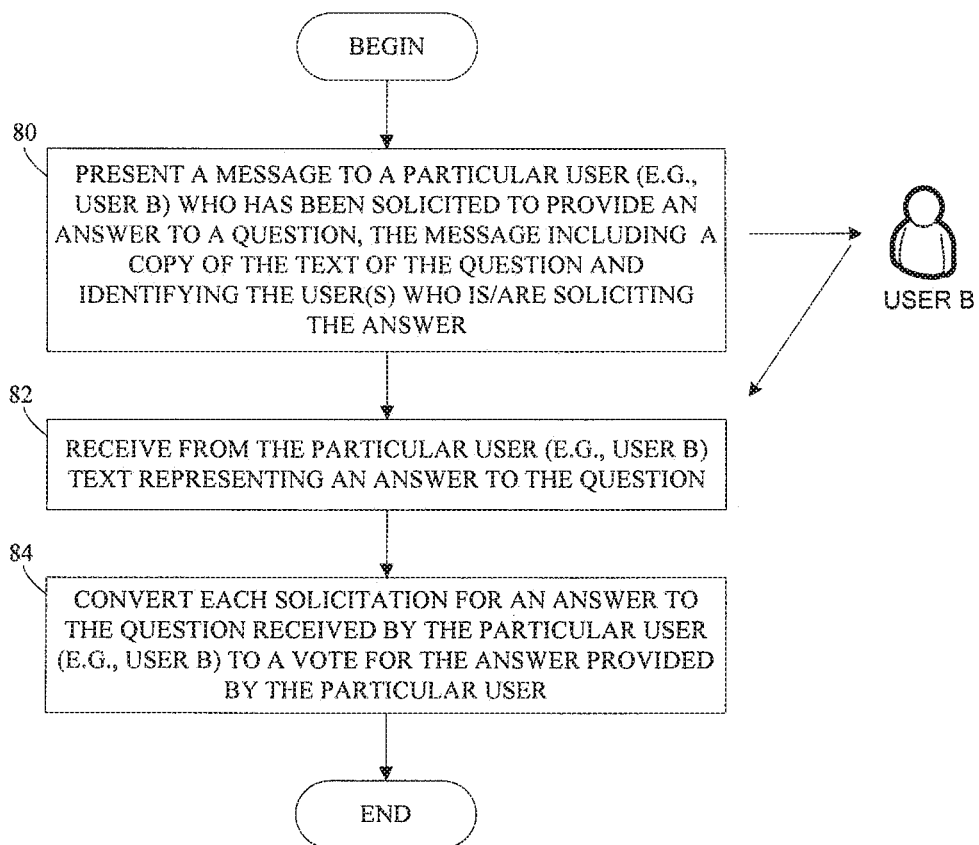
FIGS. 5 and 6 are flow diagrams representing methods, consistent with embodiments of the invention, for presenting a user, who has been solicited for an answer to a question, with a request or solicitation message that asks the user to answer a question.
Figure 11:

FIG. 5 is a flow diagram representing a method for processing a user's solicitation for an answer to a question, and the reply provided by the user who has been solicited, consistent with an embodiment of the invention. At method operation 80, the question-and-answer service presents a message to a particular user who has been solicited to provide an answer to a question, such that the message includes a copy of the text of the question, and identifies the user or users who are requesting that the user provide an answer. The format and communication mechanism of the message may vary depending upon the particular implementation. Two example solicitation messages are shown in FIGS. 11-A and 11-B. For example, with some embodiments, the message to the user (e.g., USER B) indicating that the user has been asked to provide an answer may first appear as a notification on a web page displayed to the user. This notification, for example, may notify the user that he or she has received an email, or other message, from another user requesting an answer to the question. By selecting a user interface element (e.g., button or link) corresponding with the notification, the user will be directed to an email inbox and presented with a user interface including a text input box where the user can enter an answer. Alternatively, the user may select a link to the question page, where a text input box will be presented to the user, enabling the user to enter an answer to the question. Of course, alternative messaging mechanisms and message formats may be used to communicate the message to the user.

Next, at method operation 82, the question- and answer service receives text representing an answer to the question from the solicited user (e.g., USER B). The text may be received, for example, through the submission of a web-based form displayed to the user via an e-mail or web page. Finally, in some embodiments, at method operation 84, each solicitation for an answer to the question received by the user (e.g., USER B) is converted to a vote for the answer provided by the user. This final method operation 84 is an optional operation and may not be performed in all embodiments.

Figure 6:
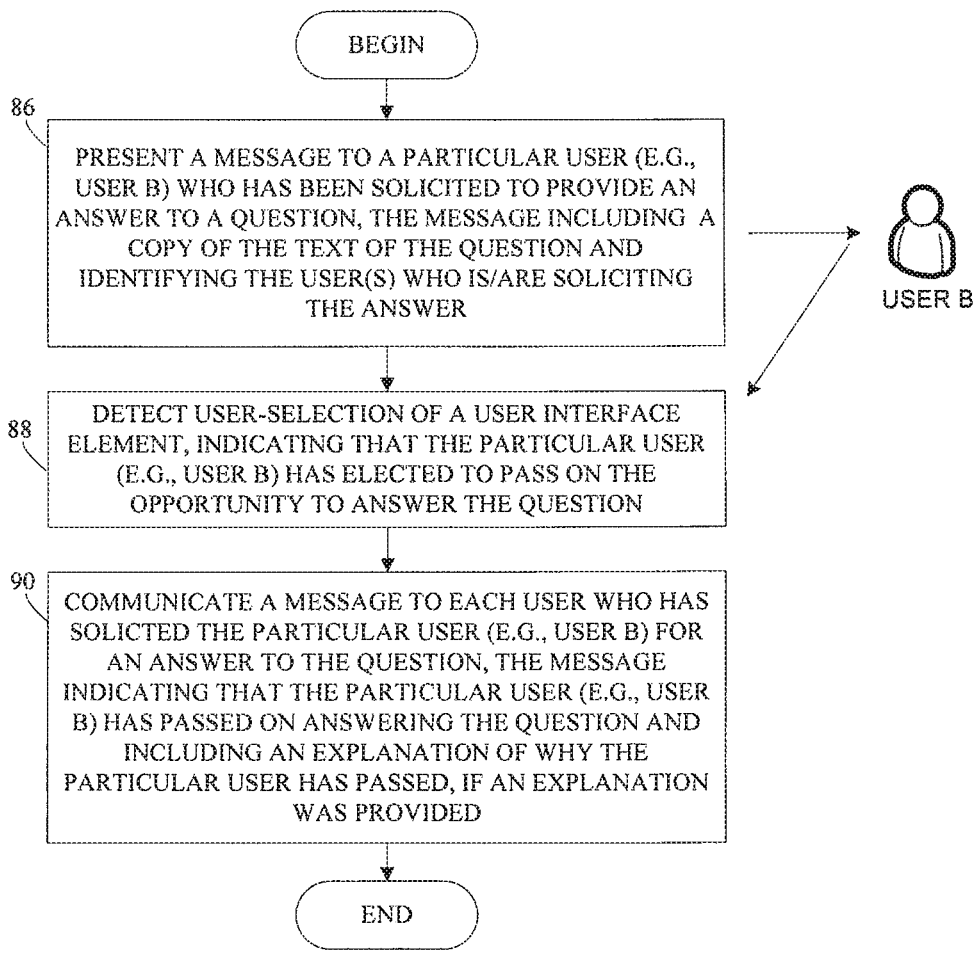
Figure 12:
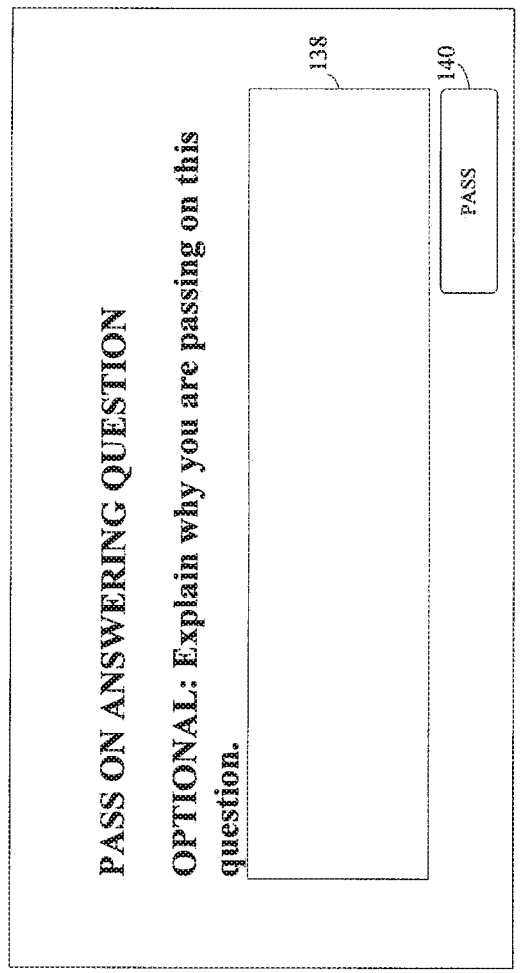

FIG. 6 is a flow diagram representing a method, consistent with some embodiments of the invention for processing a user's solicitation for an answer, when the user decides not to answer the question. The method begins at method operation 86 when the question-and-answer service presents a message to a user who has been solicited to provide an answer to a question. The message includes a copy of the text of the question, or a link to the question page for the question. The user is then prompted to either provide an answer by entering text in a text input box, or indicate a desire to pass on answering the question, for example, by selecting a user interface element, such as a button or link. Accordingly, at method operation 88, the question-and-answer service detects selection of a user interface element that indicates the user has opted to pass on answering the question. With some embodiments, the user is offered the opportunity to provide an explanation as to why the user is passing on answering the question, for example, by providing explanatory text at a text input box, such as that illustrated in FIG. 12. Finally, at method operation 90, the question-and-answer service communicates a message to each user who had requested that the user provide an answer to the question. In some instances, when a user asks another user to answer a question after the solicited user has already passed on answering the question, the explanation as to why the solicited user has passed on answering the question will automatically be presented to the requesting user.

FIG. 7 is a user interface diagram illustrating an example of a user interface for use with a question-and-answer application consistent with an embodiment of the invention. The example user interface shown in FIG. 7 is provided to convey an understanding of the inventive concepts described herein, and a particular context in which the inventive subject matter might be implemented. It will be readily appreciated by skilled artisans that the user interfaces illustrated herein are examples and that user interfaces differing from those illustrated herein may be applicable to the inventive concepts described herein.

As illustrated in FIG. 7, a header or banner section 100 is shown to include a text input box 102 where a user can enter a question, or alternatively, enter one or more keywords to be used in a search for a question, topic, user, or other item of content. Under the header section 100 is a portion of the user interface showing a question 104, and several topics 106 to which the question is currently assigned. For instance, in this example, the question is: "What are the most popular rides at Disneyland?" The topics 106 to which the question has been assigned include: "Amusement Parks" and "Disneyland." Next to the topics is an "ADD TOPIC" link or button 108 enabling a user to add a new topic to be associated with the question. In addition, a separate button or link 110, shown in FIG. 7 with text "ADD QUESTION DETAILS" provides the user with the ability to enter additional details about the question. Separate buttons or links exist for other user functionality, such as adding comments about the question, adding a follow-up question and flagging the question, for example, as being inappropriate.

In this example user interface, beneath the question 104 are two answers 112 and 114 provided by two different users. Associated with each answer is a name of the user who posted the answer, along with an indication of the number of people following that user. For example, the first answer 112 was posted by the user, John Smith, followed by one-hundred-twelve (112) users, while the second answer 114 was posted by Kate Johansen with no followers. Beneath each respective answer are buttons or links that enable a user to add a comment about an answer, or indicate that an answer was helpful or not helpful. In addition, to the left of each answer are two arrows for use in voting. For example, the arrow buttons (up and down) for the answer posted by John Smith are shown with reference number 116. The votes for and against an answer may be used in an algorithm that determines the order in which answers to a particular question are presented.

At the bottom of the example user interface in FIG. 7, there is a text input box 118 providing a user with the ability to submit a new answer to the question 104. For example, a user can type an answer in the text input box 118 and then hit the "SUBMIT ANSWER" button 120 to post the answer to the question-and-answer service. To make an answer anonymous, such that the posting user's name will not be displayed next to the answer, an anonymous button or link (e.g., labeled as "make anonymous" in FIG. 7) is provided.

In the right side of the user interface, there is a "FOLLOW QUESTION" button 122 that enables a user to subscribe to, or follow, the question. By following the question, the user will be notified when others post new answers to the question. Beneath the "FOLLOW QUESTION" button 122 are several questions determined to be related to the question 104 on the current question page. Selecting one of these questions will lead the user to the question page for the selected question.

In addition, to the right side of the example user interface shown in FIG. 7 are two user interface elements (e.g., buttons or links) labeled, "SHARE QUESTION" 124 and "ASK TO ANSWER" 126. The "SHARE QUESTION" button 124 enables a user to post the question, or otherwise direct the question, to other users, for example, via one or more social networking services, a proprietary email system facilitated via the question-and-answer service, or an externally hosted email system. Other sharing mechanisms may be possible as well. In general, sharing a question differs from what is referred to herein as the "ask-to-answer" feature in that there is no explicit call to action when simply sharing a question.

Next to the "SHARE QUESTION" button 124 is an "ASK TO ANSWER" button 126. The "ASK TO ANSWER" button 126 enables a user to solicit another user for an answer to the question. For instance, as described in connection with the method illustrated in FIG. 3, when the question-and-answer service detects that a user has selected the "ASK TO ANSWER" button 126, a user interface element, such as a text input box, is displayed, allowing the user to enter the name of a user to whom the question is to be directed. An example of this (e.g., the text input box) is illustrated in FIG. 8 with reference number 130.

Referring now to FIG. 9, as a user enters a name in the text input box 130, a list of users 132 is automatically populated in real-time, responsive to the input entered by the user, with names matching the input provided by the user, allowing the user to select from the list a name of a user to whom the question is to be directed. In some embodiments, the list 132 may be populated with names selected from the entire user community. However, in alternative embodiments, the names may be selected to include only those persons with whom the user has some pre-defined relationship, for example, via a social networking service and/or the question-and-answer service. The matching algorithm used to match the user-input with user's names may analyze and match first names, last names, or other portions of a user's name. For instance, if a user enters the text, "drew", the name "Andrew" may be displayed as a potential match.

In some embodiments, the question-and-answer service will automatically select the list of user's names to be included in the drop-down list 132 based on the user-provided input, and will then rank or order the names based on a variety of factors, such that the names of those users who are most likely to provide a meaningful answer to the question are shown first (e.g., at the top) in the list. For example, the names in the list 132 may be ranked, and then ordered, based on whether a user has a relationship with the requesting or soliciting user, such that those users with whom the requesting user has a relationship are shown in a more prominent position in the list. In some embodiments, those users who have previously answered questions on a topic to which the question being shared is assigned will be shown more prominently in the list. In some embodiments, users who have been recognized as experts on a topic, either through user endorsements or by some other means of recognition, are given greater weight in the ranking algorithm, and are therefore shown more prominently in the list. In some embodiments, users who are currently online—for instance, participating in an active user session with the question-and-answer service—are given greater weight in the ranking algorithm and are therefore shown more prominently in the list. These, and a variety of other factors, may be utilized when presenting a list of names for selection by the soliciting user.

Once a user identifies the name of a user to whom a question is to be directed, the user simply selects the name from the list and the question-and-answer service automatically communicates a message to the selected user, such that the message requests that the selected user provide an answer to the question. In addition, the question-and-answer service stores information associated with the solicitation so that such information can be displayed on the question page for the question in response to subsequent requests for the question page. This information may include, for example, the name of the user that has requested an answer to the question, the name of the user who has been requested to answer the question, the number of users who have requested that a particular user answer the question, and so forth.

In some embodiments, the question-and-service may analyze a variety of factors to recommend or suggest to a particular user the names of other users who may be well-suited to answer a particular question, or highly likely to provide an answer, if asked to provide an answer. For instance, such factors may include any one or more of the following, in various combinations: the relationship that exists between the users, the number of questions on a particular topic that a user has previously answered, the net number of positive votes that user's answers have received for a certain topic, a high correlation between the topics assigned to a question and the topics being followed by a user, and the designation or recognition of a user as a knowledge expert on a given topic. With some embodiments, the suggested users from whom a particular user might solicit an answer are displayed by default on the question page. Alternatively, the question page may include a user interface element (e.g., button or link), which, when selected, generates an additional user interface that presents the suggested users from whom the particular user might solicit an answer to a question. With some embodiments, when displaying the list of suggested users who might be solicited for an answer to a question, a topic-specific biographical statement pertaining to each suggested user may be presented along with the suggested user's name, to provide the viewing user with some additional information for use in assessing whether or not to direct a question to the user.

FIG. 10 illustrates an example user interface, consistent with some embodiments of the invention, for a question page of a question-and-answer service, where the question page includes a notification indicating that a user has been solicited for an answer to the question on the question page. For example, in the example question page of FIG. 10, there are two user interface elements, with reference numbers 134 and 136, which represent notifications that indicate a user has been asked, via the ask-to-answer feature, to provide an answer to the question on the question page. In some embodiments, each notification may be customized to show a picture of the person that has been asked to answer the question. In addition, the notification may display a number (e.g., number "3" in notification 134) that represents the number of people who have asked that particular user to answer the question. With some embodiments, each notification may also include or be associated with another user interface element, such as the check mark in the notification with reference number 134, which enables a user to very quickly request that the user provide an answer to a question. For instance, in the example of FIG. 10, by selecting the check mark shown with the notification 134, an additional request will be directed to the person represented by the notification 134 who has already been asked to answer the question by three other users. With some embodiments, if the user to whom the question page has been presented has been asked to answer the question, the notification may include or be associated with another user interface element, such as the "X" in the notification with reference 136, which enables the viewing user to pass on answering the question. For instance, if a user selects the "X" in the notification with reference 136, the user will be presented with a text input box and prompted to, optionally, provide a reason why the user is choosing not to answer the question. For instance, if a user selects the "X" in the notification with reference 136, the user may be presented with a user interface similar to that shown in FIG. 12. When the solicited user provides an explanation in the text input box 138 (of FIG. 12), and then selects the "PASS" button with reference number 140, a message including the user-provided explanation will be communicated to all requesting users who had requested that the user provide an answer to the question.

Although not illustrated in FIG. 10, consistent with some embodiments, one or more additional notifications may be displayed in connection with the notifications with reference numbers 134 and 136 to identify the users who have requested that the solicited user provide an answer to the question. In some instances, this information may be visible when a user manipulates the cursor or tracking device (e.g., mouse pointer) to hover over one of the notifications 134 or 136 (generally referred to as a mouse-over event.) For instance, when a mouse-over event is detected, additional information about the solicitations may be displayed, to include the names and or pictures of the users who have requested the solicited user to provide an answer.

FIGS. 11-A and 11-B represent portions of a user interface included in a message to a user who has been solicited by another user for an answer to a question. For example, the example shown in FIG. 11-A may be displayed as a notification on a web page. By selecting the question, the user is redirected to the question page for the question where the user can then provide an answer to the question. In some instances, such as that illustrated in FIG. 11-B, the message communicated to the solicited user will include a text input box allowing the user to provide an answer to the question without requiring the user to navigate to the actual question page for the question. Such a message may be communicated to a user via email, enabling the recipient to quickly provide an answer without navigating directly to the question-and-answer service.

Skilled artisans will recognize that the methods and user interfaces presented herein are presented as specific examples of how the inventive concepts may be implemented. However, methods and user interfaces that differ from the specific examples presented herein may be consistent with the general scope and spirit of the inventive concepts. Particularly, the order in which certain method operations occur may vary from the examples presented herein without departing from the scope and spirit of the inventive concepts. Similarly, a wide variety of user interface elements different from those presented herein may be used to implement the inventive concepts described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules or logical components referred to herein may, in some example embodiments, comprise processor-implemented modules or logic.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 13:
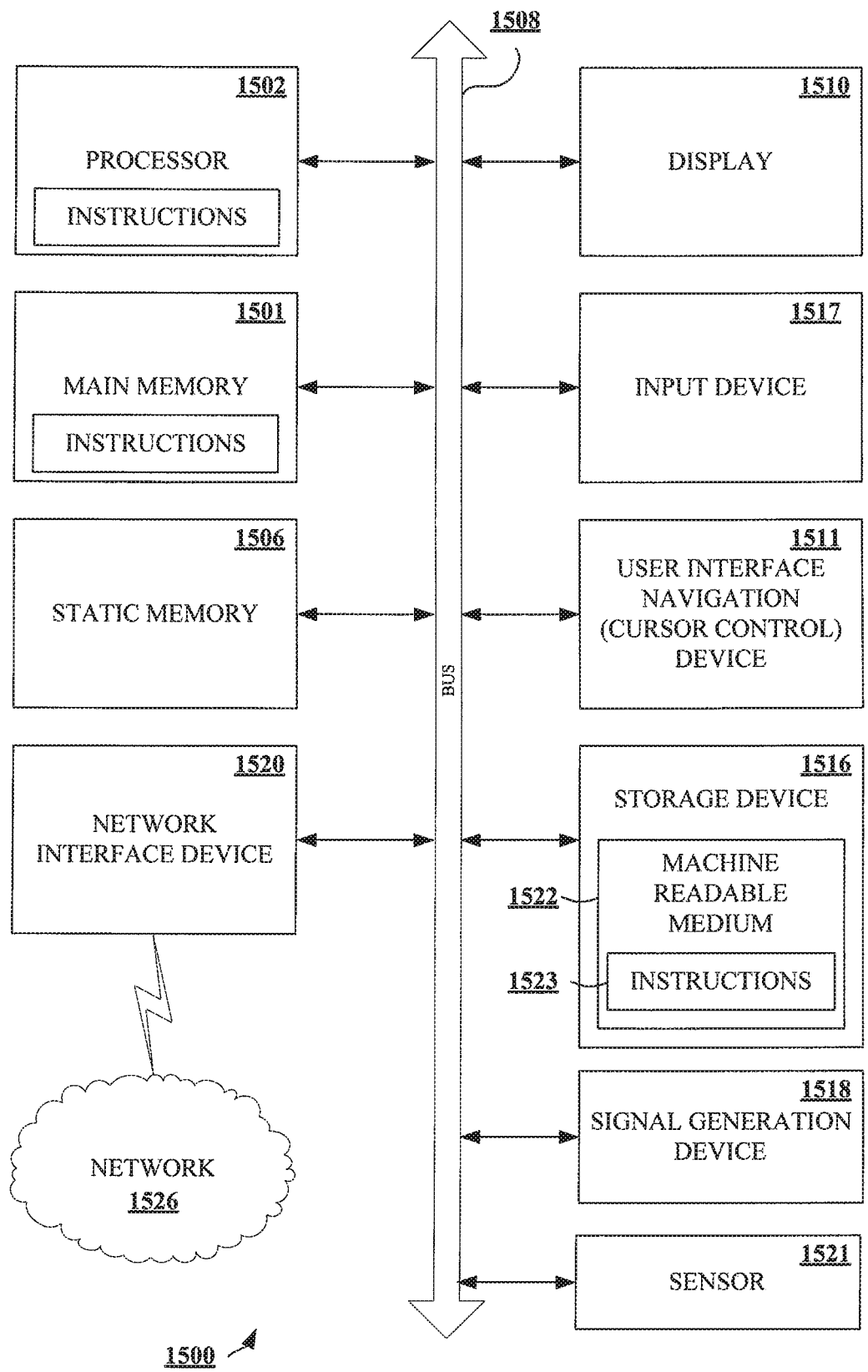
FIG. 13 is a block diagram of a machine in the form of a computer within which a set of instructions, for causing the machine to perform any one or more of the methodologies discussed herein, may be stored and executed.

FIG. 13 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed:

1. A computer-implemented method, comprising:
   receiving, by a computer server hosting a question-and-answer service, a question associated with a first user identifier;
   receiving input identifying a plurality of second user identifiers from a set of second user identifiers, wherein the plurality of second user identifiers respectively represent a corresponding plurality of users;
   identifying one more users of the plurality of users that have previously declined to answer the question;
   facilitating a transmission that includes a request to answer the question to users associated with a revised list of second user identifiers, the revised list of second identifiers excluding the second user identifiers of the one or more users that previously declined to answer the question; and
   displaying an answer from at least one user corresponding to the revised list of second user identifiers along with a number of votes, wherein the number of votes is equal to a quantity of users that requested the at least one user to answer the question.

2. The method of claim 1, wherein the list of second user identifiers includes second user identifiers with which the first user identifier is unilaterally connected.

3. The method of claim 1, wherein the list of second user identifiers includes second user identifiers with which the first user identifier is bilaterally connected.

4. The method of claim 1, wherein the list of second user identifiers includes at least one user identifier unknown to the server hosting the question-and-answer service.

5. The method of claim 1, wherein the transmission indicates that a user associated with the first user identifier is anonymous.

6. The method of claim 2, wherein facilitating the transmission includes: transmitting the request to answer the question over a web interface.

7. The method of claim 1, wherein the list of second user identifiers is ordered according to a likelihood that a user corresponding to the list of second user identifiers will provide an answer to the question.

8. A system comprising:
one or more processors; and
a non-transitory computer-readable medium storing instructions that when executed by the one or more processors, cause the one or more processors to perform operations including:
  receiving, by a computer server hosting a question-and-answer service, a question associated with a first user identifier;
  receiving input identifying a plurality of second user identifiers from a set of second user identifiers, wherein the plurality of second user identifiers respectively represent a corresponding plurality of users;
  identifying one more users of the plurality of users that have previously declined to answer the question;
  facilitating a transmission that includes a request to answer the question to users associated with a revised list of second user identifiers, the revised list of second identifiers excluding the second user identifiers of the one or more users that previously declined to answer the question; and
  displaying an answer from at least one user corresponding to the revised list of second user identifiers along with a number of votes, wherein the number of votes is equal to a quantity of users that requested the at least one user to answer the question.

9. The system of claim 8, wherein the list of second user identifiers includes second user identifiers with which the first user identifier is unilaterally connected.

10. The system of claim 8, wherein the list of second user identifiers includes second user identifiers with which the first user identifier is bilaterally connected.

11. The system of claim 8, wherein the list of second user identifiers includes at least one user identifier unknown to the server hosting the question-and-answer service.

12. The system of claim 8, wherein the transmission indicates that a user associated with the first user identifier is anonymous.

13. The system of claim 8, wherein facilitating the transmission includes: transmitting the request to answer the question over a web interface.

14. The system of claim 8, wherein the list of second user identifiers is ordered according to a likelihood that a user corresponding to the list of second user identifiers will provide an answer to the question.

15. A non-transitory computer-readable medium storing instructions that when executed by one or more processors, cause the one or more processors to perform operations including:
  receiving, by a computer server hosting a question-and-answer service, a question associated with a first user identifier;
  receiving input identifying a plurality of second user identifiers from a set of second user identifiers, wherein the plurality of second user identifiers respectively represent a corresponding plurality of users;
  identifying one more users of the plurality of users that have previously declined to answer the question;
  facilitating a transmission that includes a request to answer the question to users associated with a revised list of second user identifiers, the revised list of second identifiers excluding the second user identifiers of the one or more users that previously declined to answer the question; and
  displaying an answer from at least one user corresponding to the revised list of second user identifiers along with a number of votes, wherein the number of votes is equal to a quantity of users that requested the at least one user to answer the question.

16. The non-transitory computer-readable medium of claim 15, wherein the list of second user identifiers includes second user identifiers with which the first user identifier is unilaterally connected.

17. The non-transitory computer-readable medium of claim 15, wherein the list of second user identifiers includes second user identifiers with which the first user identifier is bilaterally connected.

18. The non-transitory computer-readable medium of claim 15, wherein the list of second user identifiers includes at least one user identifier unknown to the server hosting the question-and-answer service.

19. The non-transitory computer-readable medium of claim 15, wherein the transmission indicates that a user associated with the first user identifier is anonymous.

20. The non-transitory computer-readable medium of claim 15, wherein the list of second user identifiers is ordered according to a likelihood that a user corresponding to the list of second user identifiers will provide an answer to the question.

* * * * *